United States Patent [19]

Simmons

[11] Patent Number: 4,790,673
[45] Date of Patent: Dec. 13, 1988

[54] ROCK NECK BEARING ASSEMBLY AND INNER BEARING COMPONENT THEREFOR

[75] Inventor: Thomas E. Simmons, Westford, Mass.

[73] Assignee: Morgan Construction Company, Worcester, Mass.

[21] Appl. No.: 31,416

[22] Filed: Mar. 30, 1987

[51] Int. Cl.$^4$ .............................................. F16C 33/74
[52] U.S. Cl. ..................................... 384/147; 384/130
[58] Field of Search ............... 384/147, 148, 280, 281, 384/485, 130

[56] References Cited

U.S. PATENT DOCUMENTS

| | | | |
|---|---|---|---|
| 1,839,677 | 1/1932 | Hodge | 384/485 |
| 3,852,858 | 12/1974 | Van Der Horst | 384/280 |
| 4,547,082 | 10/1985 | Gerretz et al. | 384/280 |

Primary Examiner—Lenard A. Footland
Attorney, Agent, or Firm—Samuels, Gauthier, Stevens & Kehoe

[57] ABSTRACT

In a bearing assembly for a roll neck in a rolling mill, an inner seal ring is mounted with an interference fit as by shrink fitting, on an end portion of an inner bearing component, e.g., the sleeve of an oil film bearing or the inner race of a roller bearing. The end portion of the inner bearing component is suitably dimensioned and configured to deflect radially inwardly under the influence of hoop stresses developed as a result of the aforesaid interference fit, thereby causing the inner seal ring to be inclined towards the roll end face. The end portion of the inner bearing component has an outer diameter which is larger than the outer diameter of the remainder of the inner bearing component.

11 Claims, 2 Drawing Sheets

ROCK NECK BEARING ASSEMBLY AND INNER BEARING COMPONENT THEREFOR

BACKGROUND OF THE INVENTION

1. Field of the Invention

This invention relates to an improvement in bearings of the type employed to rotatably support the roll necks of rolls in a rolling mill.

2. Description of the Prior Art

In a conventional prior art oil film bearing assembly, as partially illustrted in FIG. 1, the rolling mill roll has a roll body 10 joined to a smaller diameter roll neck 12, with the juncture therebetween being at least partially defined by a curved transition portion 14 and a roll end face 16 lying in a plane perpendicular to the roll axis. An inner bearing component 18, in this case a sleeve, is received on and fixed relative to the roll neck 12 for rotation therewith. The inner bearing component rotates within a bushing 20 contained in a bearing chock 22, and an oil film is maintained hydrodynamically between the sleeve and bushing during normal operation of the mill. The bearing assembly further includes a sealing arrangement 24 interposed between the chock 22 and the roll end face 16 for excluding contaminants such as cooling water and mill scale from penetrating into the bearing, and for preventing oil from escaping from the bearing. The seal arrangement includes an inner seal ring 26 bridging the gap between the inboard end of the inner bearing component 18 and the roll end face. The inner seal ring 26 is normally heat shrunk onto the roll neck, and is desirably in contact as at 28 with the roll end face 16. An O-ring 30 is supported by the outer radial edge of the inner seal ring and is held against the roll end face by a keeper ring 32, the latter being removably attached to the inner seal ring by machine screws 34 or the like. An outer seal ring 36 is fixed to the chock 22. The outer seal ring carries flexible seals 38, and a flexible water guard 40. The seals 38 and water guard 40 are in frictional contact respectively with surfaces of the inner seal ring 26 and keeper ring 32. Much the same arrangement is found in conventional roller bearing assemblies, except that here the inner bearing component comprises the inner bearing race. It is to be understood, therefore, that as herein employed, the term "inner bearing component" is to be construed broadly to include either the sleeve of an oil film bearing or the inner race of a roller bearing.

One problem with the above described prior art arrangement is that as the inner seal ring 26 undergoes thermal contraction during the heat shrinking operation, it exhibits a tendency to pull away from the roll end face 16, thereby creating a gap in place of the contact area 28 shown in FIG. 1. This severely compromises the sealing integrity of the O-ring 30.

Another problem with the prior art arrangement is that in order to replace a worn inner seal ring 26, one must first remove the inner bearing component 18. This can be extremely time consuming and expensive. In cases where the inner bearing component has been shrunk onto the roll neck, it may become necessary to destroy the inner bearing component by cutting it away from the roll neck.

A general object of the present invention is to provide a mounting arrangement for the inner seal ring which obviates or at least substantially minimizes the aforementioned problems.

A more specific object of the present invention is to mount the inner seal ring in a manner such that the thermal contraction which occurs during the heat shrinking operation will urge the inner seal ring towards rather than away from the roll end face. This in turn significantly enhances the sealing integrity of O-rings or the like supported against the roll end face by the inner seal ring.

Still another object of the present invention is to mount the inner seal ring in a manner such that it can be removed and replaced without disturbing the position of the inner bearing component on the roll neck.

SUMMARY OF THE INVENTION

The foregoing objects and advantages of the present invention are achieved by mounting the inner seal ring with an interference fit, e.g., by shrink fitting, on an end portion of the inner bearing component. The end portion of the inner bearing component is configured and dimensioned to deflect angularly and radially inwardly under the influence of the hoop stresses developed in the inner seal ring. This angular inward radial deflection causes the inner seal ring to be inclined towards the roll end face, thereby offsetting any tendency that the seal ring might otherwise have to pull away from the roll end face as a result of thermal contraction.

The end portion of the inner bearing component has an outer diameter which is larger than the outer diameter of the remaining body portion of the inner bearing component. This enables the inner seal ring to be removed axially from the inner bearing component and allows a new inner seal ring to be installed without disturbing the position of the inner bearing component on the roll neck.

These and other objects, features and advantages of the present invention will be described in greater detail with reference to the accompanying drawings, wherein:

DETAILED DESCRIPTION OF PREFERRED EMBODIMENT

Figure 1:
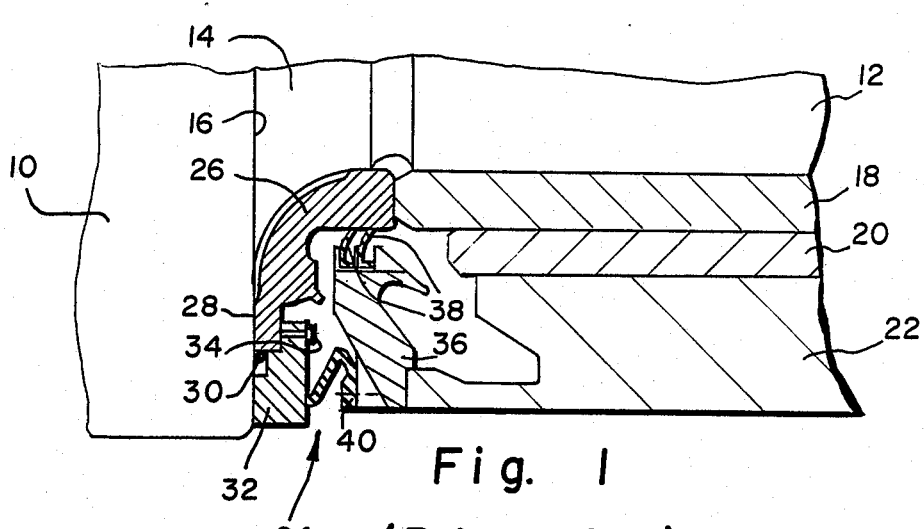
FIG. 1 is a partial sectional view of a typical prior art bearing assembly.
Figure 2:
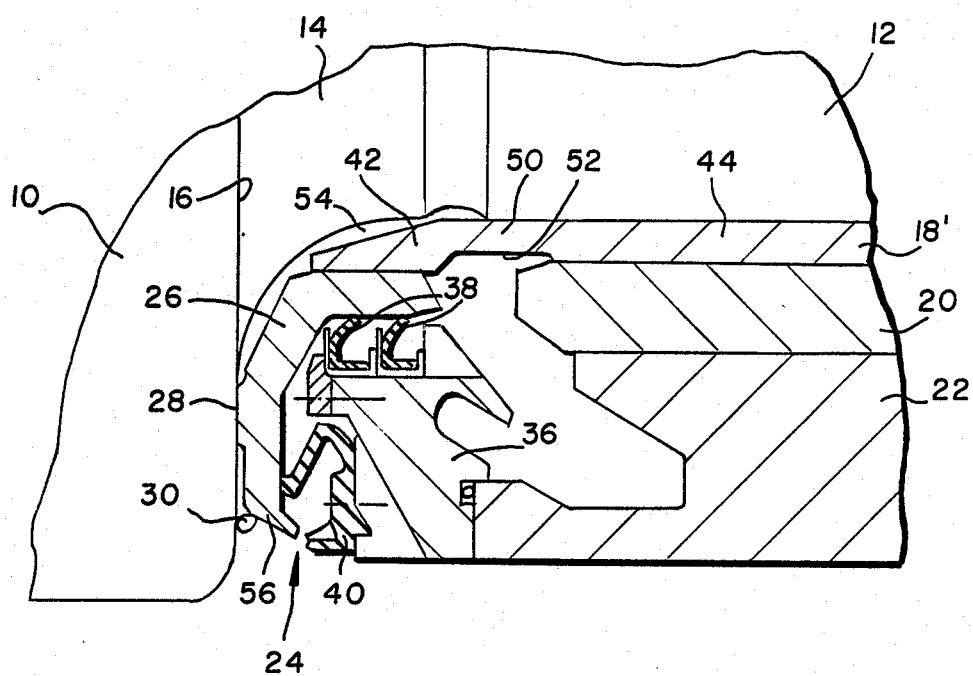
FIG. 2 is a view similar to FIG. 1 showing a bearing assembly embodying the concepts of the present invention.
Figure 3:
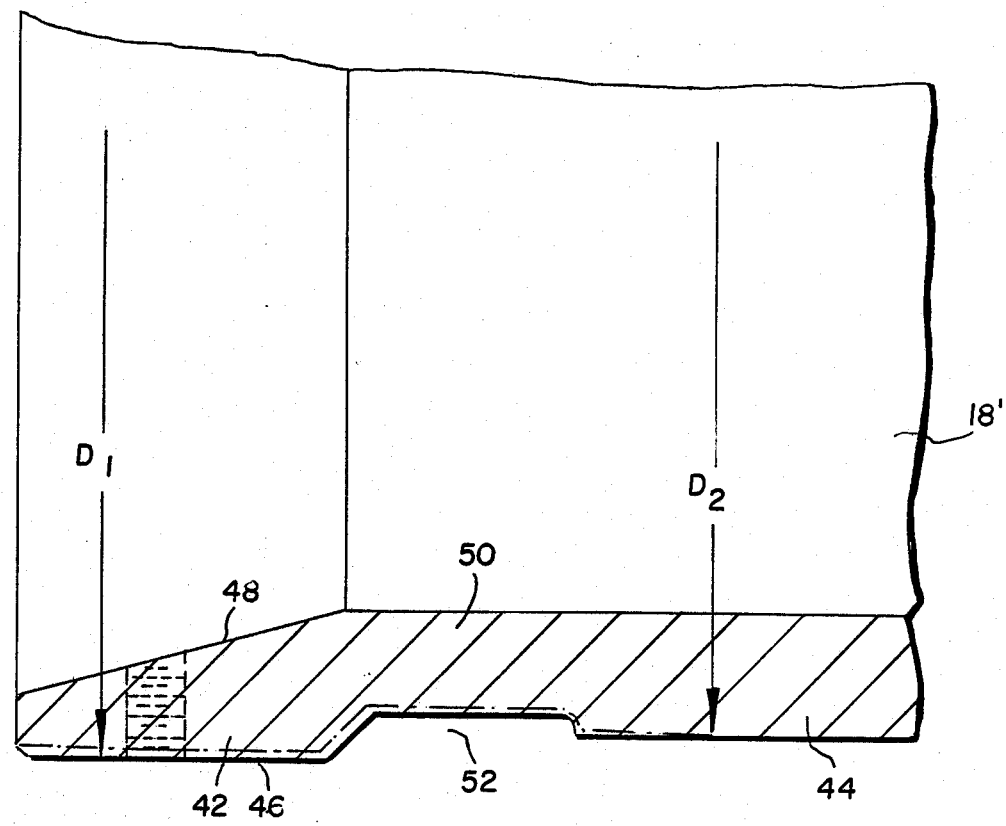
FIG. 3 is an enlarged partial end view of an inner bearing component of the present invention.

Referring now to FIG. 2, where the same reference numerals have been employed to identify those components which are common to the prior art bearing assembly shown in FIG. 1, it will be seen that the inner bearing component 18' is provided with an end portion 42 extending inwardly beyond the main body portion 44 radially supporting the roll neck. As can best be seen in FIG. 3, the end portion 42 has a truncated tapered cross-sectional configuration defined by a cylindrical outer surface 46 and a conical inner surface 48 which extends angularly outwardly towards the roll end face. The end portion 42 is separated from the body portion 44 of the inner bearing component by a web 50 of reduced material thickness forming the base of an external circular groove 52. The outer diameter $D_1$ of the end portion 42 is larger than the outer diameter $D_2$ of the main body portion 44. The conical inner surface 48 and a portion of the web 50 are spaced radially as at 54 from the roll neck.

The inner seal ring 26 is mounted with an interference fit on the end portion 42. Typically, this is accomplished by heat shrinking the inner seal ring onto the cylindrical outer surface 46. Thus, the inner seal ring is initially expanded by heating, is then axially inserted onto the end portion 42, and is thereafter allowed to cool while undergoing thermal contraction. This sets up hoop stresses in the inner seal ring which forcibly deflect the end portion 42 angularly and radially inwardly into the space 54 and towards the roll neck. As this occurs, the cylindrical outer surface 46 assumes a somewhat truncated conical shape as indicated by the broken lines in FIG. 3. The inner seal ring 26 supported on surface 46 is thus inclined towards the roll end face 16, causing it to contact the roll end face as at 28. This insures that the outer lip 56 of the inner seal ring is properly located with respect to the roll end face. An O-ring 30 is then positioned between the lip 56 and the roll end face. The external groove 52 facilitates deflection of the end portion 42.

In the event that it becomes necessary to replace the inner seal ring 26, it can be reheated and removed axially from the inner bearing component without disturbing the inner bearing component's position on the roll neck. This removal is made possible by the fact that the outer diameter $D_1$ of the end portion 42 is greater than the diameter $D_2$ of the body portion 44. This feature is of importance regardless of how the inner seal ring is mounted, i.e., by means of an interference fit or otherwise.

I claim:

1. In a bearing assembly of the type adapted to to rotatably support the neck of a roll in a rolling mill, the roll having a roll body joined to the roll neck at a juncture therebetween which is at least partially defined by a roll end face, the bearing assembly including an inner bearing component adapted to be axially received on the roll neck and an inner seal ring positioned adjacent to the roll end face, the improvement comprising: said seal ring being mounted with an interference fit on an end portion of said inner bearing component, said end portion being spaced radially from said roll neck and being configured and dimensioned to deflect radially inwardly under the influence of hoop stresses developed in said seal ring as a result of said interference fit, thereby causing said seal ring to be inclined towards said roll end face.

2. The improvement of claim 1 wherein said end portion is provided with a tapered cross sectional configuration.

3. The improvement of claim 2 wherein said tapered cross sectional configuration is defined by a cylindrical outer surface and a conical inner surface which extends axially and radially outwardly towards the roll end face.

4. The improvement of claim 1 wherein said end portion is separated from the remainder of said inner bearing component by a circular groove in the external surface thereof.

5. The improvement of claim 1 wherein said end portion has an outer diameter larger than the outer diameter of the remainder of said inner bearing component.

6. The improvement of claim 1 wherein said inner bearing component has a cylindrical body portion defining an external journal surface, with said end portion protruding axially from said body portion, and with the outer diameter of said end portion being greater than the outer diameter of said body portion.

7. The improvement of claim 1 wherein said end portion is axially connected to the remainder of said inner bearing component by a web of reduced thickness.

8. The improvement of claim 7 wherein said web is formed at the base of an external circular groove.

9. The improvement of claim 8 wherein said end portion has a tapered cross sectional configuration defined by a cylindrical outer surface and a conical inner surface and wherein said cylindrical outer surface has an outer diameter greater than that of the said remainder of said inner bearing component.

10. In a roll neck bearing assembly for a roll in a rolling mill, the roll having a roll body which is larger in diameter than the roll neck with a juncture therebetween being defined at least partly by a roll end face lying in a plane perpendicular to the roll axis, the bearing assembly including an inner component mounted with a first interference fit on the roll neck, and an inner seal ring positioned adjacent to the roll end face, the improvement comprising: said inner seal ring being mounted with a second interference fit on an end portion of said inner component, said end portion being spaced radially from the surface of said roll neck and being configured and dimensioned to deflect radially inwardly under the influence of the hoop stress developed in said seal ring as a result of said second interference fit, thereby urging said inner seal ring towards said roll end face.

11. An inner bearing component for a bearing assembly of the type adapted to be axially received on the neck of a roll in a rolling mill, the roll having a roll body larger in diameter than and joined to the roll neck at a juncture therebetween which is at least partially defined by a roll end face, and the bearing assembly including a seal ring positioned adjacent to the roll end face, the improvement comprising: said seal ring being mounted on an end portion of the inner bearing component, said end portion having an outer diameter which is larger than the maximum outer diameter of the remainder of said inner bearing component, thereby permitting said seal ring to be axially removed from said end portion over the remainder of said inner bearing component while allowing said inner bearing component to remain on the roll neck.

* * * * *